United States Patent [19] [11] 4,123,073
Cremerius [45] Oct. 31, 1978

[54] SEALING BEAD FOR USE AT HIGH TEMPERATURES

[76] Inventor: Willi Cremerius, Benrodestrasse 7, 4 Dusseldorf-Benrath, Germany

[21] Appl. No.: 717,182

[22] Filed: Aug. 24, 1976

[30] Foreign Application Priority Data

Sep. 1, 1975 [DE] Fed. Rep. of Germany ....... 2538765

[51] Int. Cl.² ............................................. F16J 15/10
[52] U.S. Cl. .................................... 277/229; 277/203
[58] Field of Search ................. 277/229, 203, 230, 227

[56] References Cited

U.S. PATENT DOCUMENTS

| 63,285 | 3/1867 | Miller | 277/229 |
| 123,891 | 2/1872 | Gwynn | 277/229 |
| 1,325,876 | 12/1919 | McClure | 277/229 |
| 2,376,039 | 5/1945 | Driscoll | 277/230 |
| 2,666,005 | 1/1954 | Norehad | 277/229 |

Primary Examiner—Richard E. Aegerter
Assistant Examiner—L. Footland
Attorney, Agent, or Firm—Holman & Stern

[57] ABSTRACT

A sealing bead for use in sealing gaps in installations and machines which are intended to be operated at high temperatures, the sealing bead comprising a plurality of folded strips of paper which are twisted together to form a helical bundle of strips, the bundle being bound together by a helical thread with the helix formed by the thread being pitched less steeply than the helix formed by each of the strips.

5 Claims, 1 Drawing Figure

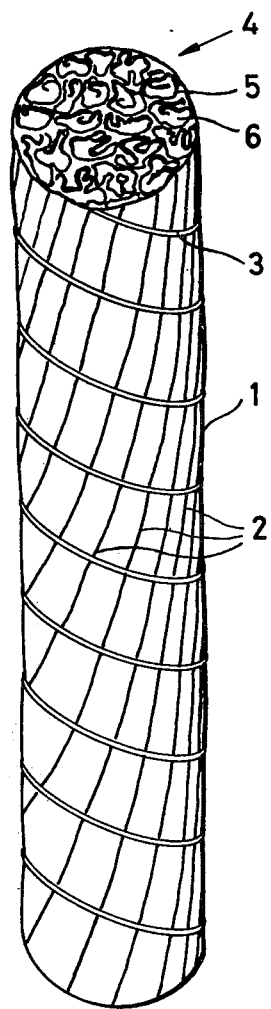

SEALING BEAD FOR USE AT HIGH TEMPERATURES

BACKGROUND OF THE INVENTION

This invention relates to a sealing bead intended to be used once only for sealing gaps in installations and machines which are operated at high temperatures, and particularly (but not exclusively) for sealing the gap between a cold billet and a mould in continuous casting machines.

Thus, for example, in a continuous casting plant the mould is closed, prior to commencement of the casting operation, by means of a "head" carried on top of the cold billet in such a way that after casting has commenced the cold billet and the head may be lowered within the mould to carry the frozen part of the continuous casting with them. In order to prevent any escape of molten steel down the sides of the cold billet at the start of the casting operation, the cold billet or its "head" is provided with a seal relative to the walls of the mould. Normally, asbestos cords are used for this purpose, which are pressed into the gap between the mould walls and the cold billet or its head. Owing to the fact that asbestos cord has only a limited degree of cross-sectional deformability however, the resulting seal is not always entirely satisfactory. For this reason it is frequently necessary to employ several layers of asbestos cord. Another disadvantage appertaining to the use of asbestos cord resides in that this material tends to produce dust rubbings which may cause serious damage to health, notably from "asbestosis". Finally, asbestos is a comparatively expensive material and, having once been used at high temperature, it is mostly quite useless for any further application and so becomes an embarrassing waste product.

SUMMARY OF THE INVENTION

It is one object of this invention to provide a sealing bead which will not possess the above-mentioned disadvantages.

With this object in mind and in accordance with the invention, there is provided a sealing bead for sealing gaps in installations and machines which are operated at high temperatures, characterized in that the bead comprises a plurality of folded strips of paper which are twisted together to form a generally helically arranged bundle of strips which are bound together by a helical thread, the helix formed by the thread being pitched less steeply than the helix formed by each of the strips.

Such a sealing bead provides an excellent answer to the stated requirements, particularly in a continuous casting plant. Since the bead is comparatively voluminous, even if tautly wrapped with a thin thread, it can very easily be compressed to be sealingly forced into gaps and interstices where it will provide a very reliable seal for as long as operative temperatures remain low. Now if, for example during continuous casting, the temperature begins to rise as the molten steel is poured into the mould head, the molten metal will at the same time prevent access of exterior air or oxygen to the sealing bead. As a result, the bead cannot burn but will merely coke or carbonize. Now, since it still has a very large volume even in compressed condition, this will only result in the formation of a thin layer of coked or carbonized material which fits exactly into the gap or interstice into which the bead had previously been pressed and through which the now rapidly cooling and freezing metal cannot escape. On the other hand, this coking process produces only very few volatile components which are either absorbed in the melt without in any way affecting the quality of the latter, or which, if the melt is sufficiently liquid, emerge therefrom in gaseous form. When, later on the cold billet emerges from the mould, the above described process has long been completed and from then onwards the frozen parts of the progressively solidifying casting itself take care of the required sealing function.

When the starter head or cold billet is detached from the newly produced continuous casting, the new sealing bead leaves no residues with the exception of some coked deposits in a few places which can be very easily removed. For this reason there is no risk of harmful dusts when the cold billet is severed or when a mould is prepared for a fresh casting operation, with a corresponding elimination of danger to the health of the operators.

Owing to its voluminous structure, the new sealing bead has only less than half the weight of a conventional asbestos cord previously used for the same purpose. Total expense is no more than approximately one tenth of the cost of an asbestos bead.

The tensile strength of the new sealing cord may be further substantially improved by replacing a portion of the crimped paper with tissue paper of higher tensile strength and likewise lower specific weight. Conveniently, from 20 to 40% of the paper is tissue paper.

While the crimped paper may have a surface/weight ratio of approximately 30 grams per square meter, a corresponding ratio of 25 grams per square meter is advised for the tissue paper.

Conveniently, the basic material for making the crimped paper is scrap or waste paper which means that expenses can be kept very low. In view of the properties demanded of the tissue paper (when used), the latter is preferably free from wood pulp. This means that both types of paper will then produce only very small quantities of volatile components or carbonized residues when heated.

The desiderata of achieving small residues and fewer volatile ingredients is further assisted by the use of an un-waxed or unpolished hempen thread, which is approximately 0.3 mm thick, as a wrapping thread around the twisted cord.

Furthermore advantageously the direction of crimping is normal to the length of the paper. Such crimping, in combination with the comparatively slight twist of the cord achieves a particularly loose or open texture.

For improving the hold or firmness of the twisted cord, it is advisable to twist the cord from approximately 12 individual strips of paper, each approximately 10 cm wide, so that the external diameter of the cord will be approximately 20 mm. The tissue paper strips (when used) may be included at regularly spaced intervals to replace an ordinary paper strip and are, advantageously, slightly wider than the crimped paper.

BRIEF DESCRIPTION OF THE DRAWING

The invention is further explained with reference to the accompanying drawing which diagrammatically illustrates a piece of one example of a new sealing bead or cord, according to the present invention.

DETAILED DESCRIPTION OF THE PREFERRED EMBODIMENT

Referring to the drawing, the bead 1 shown therein comprises a plurality of individual paper strips 5 which are each irregularly folded as may be seen from the end 4 of the bead or cord.

All of the paper strips 5 may be formed from crimped paper (the direction of crimping being normal to the strip length) which has a relatively low specific weight per unit of surface area, such as 30 grams per square meter. Alternatively, some of the crimped paper strips may be replaced by strips of tissue paper (which are wider than the crimped paper strips) having a somewhat greater tensile strength but a lower specific weight per unit of surface area, such as 25 grams per square meter. In this case, conveniently 20–40% of the paper strips are formed from tissue paper but in either case the strips 5 are twisted together to form a generally helically arranged bundle as seen in the drawing. Thus, the longitudinal edges of the strips 5 will be visible on the exterior of the bead or cord in the form of helical twist lines 2 which are, as shown, comparatively steeply pitched. In one convenient embodiment there are 12 individual paper strips 5, each approximately 10 cm. wide, and these are first folded longitudinally but irregularly as previously mentioned and are then twisted together to form a cord or bead having an overall diameter of approximately 20 mm. The crimped paper may be formed from waste or scrap paper and where used, the tissue paper is preferably free from wood pulp.

In addition, there is provided an un-waxed or unpolished hempen thread 3 which is approximately 0.3 mm. thick and which is bound round the strips in another helix which is however much less steeply pitched than the helix formed by any one of the strips 5. The thread 3 thus holds the strips 5 firmly in their twisted condition.

The aforementioned end 4 shows the loose structure of the cord. Thus the individual paper strips 5 appear irregularly folded and between the folds of the paper strips there are cavities 6 which are correspondingly reduced in size as the sealing bead is compressed.

In conjunction with the crimping of the paper of at least some of the strips 5, these cavities 6 help to impart the above described desirable characteristics to the sealing bead. Thus, if a cord of approximately 20 mm diameter is compressed to a diameter of no more than approximately 13 mm, the cavities due to the crimping of the paper are preserved so that in this condition the cord will still occupy a comparatively large volume, which makes it suitable for filling in, and sealing, even larger gaps and, on the other hand, results in the production of very small amounts of combustion products because the air contained in these cavities can burn a corresponding portion of the sealing bead when heated. Eventually the resulting gases and the carbonization gases which are formed under subsequent anaerobic conditions, when no longer able to escape upwardly through the frozen metal, may also escape between the cold billet and the mould walls in the direction towards the exit end of the mould.

I claim:

1. A sealing bead for sealing gaps in installations and machines which are operated at high temperatures, characterized in that the bead comprises a plurality of folded strips of paper consisting of from 60 to 80% of crimped paper and from 20 to 40% of tissue paper which is free of wood pulp, each of the paper strips having a surface/weight ratio not exceeding 30 grams per square meter, the strips of paper being twisted together to form a generally helically arranged bundle of strips which are bound together by a helical thread of unwaxed hemp with a thickness of about 0.3 mm, the helix formed by the thread being pitched less steeply than the helix formed by each of the strips.

2. The sealing bead according to claim 1, characterized in that the crimped paper is made from waste or scrap paper.

3. The sealing bead according to claim 1, characterized in that the crimped paper is crimped in a direction normal to its length.

4. The sealing bead according to claim 1, characterized in that the cord is produced by twisting together approximately 12 individual paper strips, each approximately 10 cm wide, to provide a helical bundle of strips having an overall diameter of approximately 20 mm.

5. The sealing bead according to claim 1, characterized in that the tissue paper strips are wider than the crimped paper strips.

* * * * *